(No Model.)
W. A. HARDY.
JOURNAL BEARING.
No. 306,249. Patented Oct. 7, 1884.
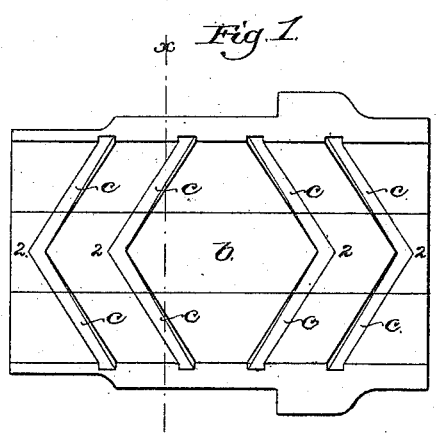
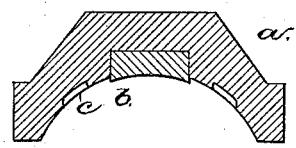

UNITED STATES PATENT OFFICE.

WILLIAM A. HARDY, OF FITCHBURG, MASSACHUSETTS.

JOURNAL-BEARING.

SPECIFICATION forming part of Letters Patent No. 306,249, dated October 7, 1884.

Application filed June 30, 1884. (No model.)

*To all whom it may concern:*

Be it known that I, WILLIAM A. HARDY, of Fitchburg, county of Worcester, State of Massachusetts, have invented an Improvement in Journal-Bearings, of which the following description, in connection with the accompanying drawings, is a specification, like letters on the drawings representing like parts.

My invention, relating to journal-bearings, has for its object to provide for the perfect distribution of the lubricant upon the wearing-surfaces and to guard against the waste of lubricating material.

The invention consists, essentially, in a bearing-box provided with grooves extending from the crown or middle portion of the bearing diagonally toward the sides or edges of the bearing, the said grooves being inclined in opposite directions from a point nearer the end of the bearing at its central line toward a point nearer the middle of the box at its edges, the grooves at the opposite ends of the box converging toward the sides of the box, so that they will tend to throw the oil or other lubricant toward the center of the box, whichever way the axle may be turning therein. Boxes have been made having diagonal grooves for the distribution of the lubricant; but the said grooves have extended diagonally across from one to the other side of the box, all parallel with one another, and thus tend to throw the lubricant toward one end of the box when the axle is running in one direction, and toward the other end when the axle is running in the other direction, in either case causing a considerable waste of the lubricant, besides the objection of having the lubricant distributed over parts not requiring lubrication.

Figure 1 is a face view of a journal-bearing embodying this invention; Fig. 2, a transverse section thereof on line $x$ $x$.

The invention is shown in this instance as embodied in a car-axle box similar in general construction to one shown in Letters Patent No. 300,362, granted to me June 17, 1884, consisting, essentially, of a shell or case, $a$, provided with a raised central bearing portion, $b$, preferably of softer material, and serving to receive the pressure until the bearing-surfaces have become properly fitted to one another. The bearing-surface of the box is provided with deep grooves $c$, arranged as shown, the said grooves extending from the central portion of the bearing at 2 toward the side thereof, and all converging or inclining from a point nearer the end of the bearing at its central part to a point nearer the middle thereof at its sides or edges. By this arrangement the grooves, besides serving to distribute the lubricating material over the bearing-surface, also operate to throw the lubricating material contained in the said grooves and scraped off from the bearing-surfaces by the edges of the said grooves toward the middle of the box, instead of throwing it out at the ends thereof, as would be the case if the grooves extended in one direction across the bearing-surface, as has usually been the case in boxes provided with diagonal grooves for distributing the lubricating material.

The invention is not limited to any special construction of the bearing-box, which either may or may not have the raised central bearing-piece $b$, and which, when having such central bearing-piece, may also have side lining-pieces, as described in my former patent referred to, or not, according to the use for which it is intended, the essential point of the invention being that the bearing-surface of the box is provided with grooves inclining in opposite directions from points along the central line of bearing nearer its ends toward the middle of the bearing near its edges, or, in other words, converging in the direction toward which the surface of the journal is moving.

I am not aware that a bearing has ever been provided each side a line drawn transversely through its center with grooves which incline from the longitudinal center of the bearing toward its opposite edges or sides, and also toward the transverse center line of the bearing from each side, whereby the oil is drawn toward the center of the bearing from each end, notwithstanding the direction of rotation of the axle.

I claim—

1. A journal-bearing provided with grooves which extend from side to side of the bearing, the portions of said grooves intersecting the longitudinal center of the bearing being farther from the transverse center of said bearing than the ends of said grooves, whereby the lubricant is distributed over the wearing-surface, and is thrown away from the ends and toward the middle of the bearing, substantially as set forth.

2. A car-journal bearing provided with two series of grooves which extend from side to side of the bearing, each series being arranged between the transverse center line of the bearing and one of its ends, the portion of each groove of the two series that intersects the longitudinal center of the bearing being farther from the transverse center line of said bearing than the ends of such groove, whereby the lubricant is distributed over the wearing-surface, and is thrown away from the ends and toward the middle of the bearing, substantially as described.

In testimony whereof I have signed my name to this specification in the presence of two subscribing witnesses.

WM. A. HARDY.

Witnesses:
CHAS. F. ROCKWOOD,
F. A. CURRIER.